United States Patent
Parikh et al.

(10) Patent No.: US 11,133,708 B1
(45) Date of Patent: Sep. 28, 2021

(54) AUTOMATED INSTALLATION OF ELECTRONIC DEVICES ON INFRASTRUCTURE COMPONENTS

(71) Applicant: Facebook, Inc., Menlo Park, CA (US)

(72) Inventors: Jay Parikh, Redwood City, CA (US); Yael Maguire, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 228 days.

(21) Appl. No.: 16/238,508

(22) Filed: Jan. 2, 2019

Related U.S. Application Data

(60) Provisional application No. 62/664,056, filed on Apr. 27, 2018.

(51) Int. Cl.
| | |
|---|---|
| *H02J 50/10* | (2016.01) |
| *H04B 5/00* | (2006.01) |
| *G06K 9/00* | (2006.01) |
| *B64C 39/02* | (2006.01) |

(52) U.S. Cl.
CPC ............ *H02J 50/10* (2016.02); *H04B 5/0093* (2013.01); *B64C 39/024* (2013.01); *B64C 2201/128* (2013.01); *G06K 9/00664* (2013.01)

(58) Field of Classification Search
CPC .............. H04B 5/0093; B64C 39/024; B64C 2201/128; G06K 9/00664; H02J 50/10; H02J 50/402
See application file for complete search history.

(56) References Cited

U.S. PATENT DOCUMENTS

| | | | |
|---|---|---|---|
| 2012/0175969 A1* | 7/2012 | Maughan | H01F 38/14 307/104 |
| 2015/0236546 A1* | 8/2015 | Kesler | H02J 7/025 455/573 |
| 2019/0165448 A1* | 5/2019 | Polehn | H01Q 5/22 |

* cited by examiner

*Primary Examiner* — Carlos Amaya
(74) *Attorney, Agent, or Firm* — FisherBroyles, LLP

(57) ABSTRACT

The disclosed apparatus may include (1) a mount of an infrastructure component, where the mount includes an installation surface that contacts an installed electronic device, and (2) a coupling mechanism that (a) provides a force causing a corresponding installation surface of the installed electronic device to maintain contact with the installation device, and (b) delivers electrical power via the installation surface to the installed electronic device. Various other apparatuses, devices, and methods are also disclosed.

17 Claims, 11 Drawing Sheets

AUTOMATED INSTALLATION OF ELECTRONIC DEVICES ON INFRASTRUCTURE COMPONENTS

CROSS REFERENCE TO RELATED APPLICATION

This application claims the benefit of U.S. Provisional Application No. 62/664,056, filed 27 Apr. 2018, the disclosure of which is incorporated, in its entirety, by this reference.

BACKGROUND

Delivery and deployment of communication infrastructure and other electronic devices may be challenging and costly. For example, deployment and/or expansion of very-high frequency (VHF) networks, ultra-high frequency (UHF) networks, and extremely-high frequency (EHF) networks (e.g., millimeter wave (MMW) band networks) may involve installing numerous line-of-sight (LOS) communication devices at relatively short intervals (because, e.g., transmission distances for VHF, UHF, and EHF network devices may be limited). Additionally, other types of electronic devices that do not form part of a communication network infrastructure (e.g., electronic signage or other displays) may also be delivered and deployed in large numbers over an expansive geographical region. Moreover, such electronic devices may be relatively inexpensive to manufacture, thus possibly resulting in the costs associated with delivery and deployment overwhelming the costs of the devices themselves.

SUMMARY

As will be described in greater detail below, the instant disclosure describes embodiments of an attachment arrangement for coupling an electronic device with an infrastructure component, as well as embodiments of the electronic device and an unmanned aerial vehicle (UAV, such as a drone) that facilitates such coupling. In one example, an attachment arrangement may include (1) a mount of an infrastructure component, where the mount includes an installation surface that contacts an installed electronic device, and (2) a coupling mechanism that (a) provides a force causing a corresponding installation surface of the installed electronic device to maintain contact with the installation surface, and (b) delivers electrical power via the installation surface to the installed electronic device. In some embodiments, the mount may include a collar that securely attaches the mount to the infrastructure component. In some examples, the installation surface may include at least one external flat surface that contacts a corresponding flat surface of the installed electronic device. The installation surface, in some embodiments, may include at least one visible registration mark that aids positioning of the installed electronic device relative to the installation surface during installation.

In some examples, the coupling mechanism may include an inductive coupling mechanism that generates a magnetic force between the coupling mechanism and the installed electronic device. Further, in some embodiments, the inductive coupling mechanism also delivers the electrical power to the installed electronic device without the inductive coupling mechanism directly contacting the installed electronic device. In some examples, the coupling mechanism may include a mechanical coupling mechanism that, when activated, mechanically retains a corresponding mechanical feature of the installed electronic device.

In some embodiments, the attachment arrangement may further include a short-range communication interface that communicates with the installed electronic device. In some examples, the short-range communication interface may include a short-range optical communication interface.

In one example, an electronic device may include (1) an installation surface that contacts a corresponding installation surface of a mount of an infrastructure component, and (2) a coupling mechanism that (a) interacts with a corresponding coupling mechanism of an attachment arrangement that includes the mount to cause the installation surface of the electronic device to maintain contact with the corresponding installation surface of the mount, and (b) receives electrical power from the corresponding coupling mechanism via the installation surface. In some embodiments, the installation surface may include at least one external flat surface that contacts a corresponding flat surface of the mount.

In some examples, the coupling mechanism may include an inductive coupling mechanism that interacts with a corresponding inductive coupling mechanism of the attachment arrangement to generate a magnetic force between the coupling mechanism and the corresponding coupling mechanism. Further, in some embodiments, the inductive coupling mechanism may also receive the electrical power from the corresponding coupling mechanism via the installation surface without the inductive coupling mechanism directly contacting the mount. In some examples, the coupling mechanism may include a mechanical feature that, when engaged by a mechanical coupling mechanism of the attachment arrangement, is mechanically retained by the attachment arrangement.

The electronic device, in some embodiments, may include a short-range communication interface that communicates with the attachment arrangement. In some examples, the short-range communication may include a short-range optical communication interface.

In some embodiments, the electronic device may include a second coupling mechanism that interacts with a corresponding coupling mechanism of an unmanned aerial vehicle for carrying the electronic device from a remote location to the mount for installation.

In one example, an unmanned aerial vehicle may include (1) a flight system that causes movement and hovering of the unmanned aerial vehicle, (2) a coupling mechanism that interacts with a corresponding coupling mechanism of an electronic device for carrying the electronic device from a remote location to a mount of an infrastructure component, and (3) an extension mechanism connecting the coupling mechanism to the flight system, where the extension mechanism dynamically extends the coupling mechanism from the flight system to facilitate installation of the electronic device to the mount while the unmanned aerial vehicle hovers. In some embodiments, the extension mechanism may include a first dynamically controllable pivoting arm that (1) maintains the electronic device, when coupled to the coupling mechanism, in a position that maintains the unmanned aerial vehicle in a rotationally balanced state when carrying the electronic device from the remote location to the mount, and (2) dynamically extends the electronic device from the flight system to facilitate the installation of the electronic device to the mount. Further, in some examples, the extension mechanism may include a second dynamically controllable pivoting arm that dynamically extends in opposition to the first dynamically controllable pivoting arm to maintain the unmanned aerial vehicle in the rotationally balanced state when the first dynamically controllable pivoting arm dynamically extends the electronic device.

In some embodiments, the unmanned aerial vehicle may further include a first communication interface that may (1) retrieve information from at least one of the electronic device and the mount, and (2) perform, based on the information, at least one or provisioning, registration, or authentication of the electronic device with a second communication interface associated with the mount. In some example, the first communication interface may include at least one of (1) an optical imager that retrieves the information from a visual symbol located on at least one of the electronic device or the mount, and (2) a short-range wireless communication interface that retrieves the information wirelessly from at least one of the electronic device or the mount.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
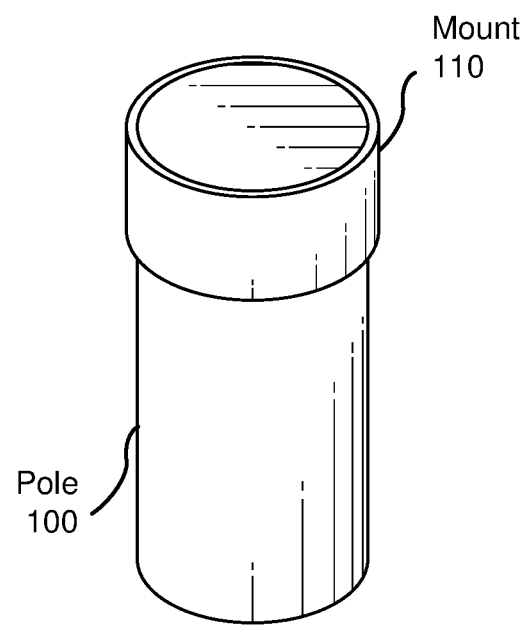
FIGS. 1-3 depict exemplary poles with exemplary mounts on which an electronic device may be installed according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to automated systems configured to plan and/or install infrastructure components in a manner that is at least partially independent of human assistance and/or intervention. As will be explained in greater detail below, embodiments of this disclosure may provide poles (or other infrastructure components), mounts, power couplings, drones, and/or other systems configured for efficient and effective deployment of electronic devices, such as communication networking devices (e.g., fifth-generation (5G) networking devices) and/or various other types of devices.

The following will provide, with reference to FIGS. 1-11, detailed descriptions of infrastructure attachment arrangements for electronic devices, as well as the electronic devices and the UAVs used to deploy the devices. A description of exemplary infrastructure components (e.g., poles) with mounts that form a portion of an attachment arrangement is presented in associated with FIGS. 1-3. A discussion of exemplary coupling mechanisms associated with a mount and an exemplary electronic device is provided in conjunction with FIGS. 4 and 5, respectively. A presentation of an exemplary attachment arrangement including a mount and a coupling mechanism, along with an installed electronic device, is set forth below in connection with the block diagram of FIG. 6. A discussion of an exemplary deployment drone employed to deliver and deploy an electronic device at a mount of an infrastructure component is presented in connection with the illustrations of FIGS. 7-9. Functionality of an exemplary deployment drone is discussed in conjunction with the block diagram of FIG. 10. An exemplary method of employing such a drone to deliver and deploy an electronic device at a mount of an infrastructure component is explained in association with the flow diagram of FIG. 11.

Embodiments of this disclosure may involve building (e.g., pre-installing) and/or configuring infrastructure components (e.g., poles) for use with an automated system for deploying devices to the infrastructure components. FIG. 1 shows an isometric view of an exemplary infrastructure component (e.g., pole 100) that may include a mount 110 configured to couple an electronic device to pole 100. In some embodiments, pole 100 may be an existing pole (e.g., a utility pole, a traffic signal pole, or the like) on which mount 110 is installed. In other embodiments, pole 100 may be preconfigured with mount 110 and may be installed with mount 110 already in place. In such examples, mount 110 may form an integral portion of pole 100. Pole 100 and/or mount 110 may also be installed in any other suitable manner that provides for unmanned aerial vehicle (UAV) access, access by other types of robots, and/or human access. For example, a height of pole 100 and/or mount 110 may be dimensioned to facilitate electronic device installation and/or servicing by UAVs. Although FIG. 1 illustrates a pole, the apparatuses and methods described herein may also be used to install electronic devices on other infrastructure components, such as buildings, walls, etc.

Mount 110 may be configured to couple a device to pole 100 in any suitable manner. In some embodiments, mount 110 may be a collar formed from steel or any other suitable material. In some examples, mount 110, along with other components described below, may be configured to attach (e.g., magnetically and/or mechanically couple) an electronic device to pole 100. Additionally or alternatively, as shown in the isometric view of FIG. 2, mount 110 may include flat facets 210 that may be configured as coupling locations or installation surfaces for electronic devices. As another example, as depicted in the top view of FIG. 3, mount 110 may include one or more flat sides 310 that may be configured as coupling locations or installation surfaces for electronic devices. Mount 110 may include any suitable number of sides or facets (e.g., 3, 4, 5, 6, etc.), and one or more of the sides or facets may contain a coupling mechanism. In some embodiments, mount 110 may be formed as an integral part of pole 100, as mentioned above.

Figure 2:
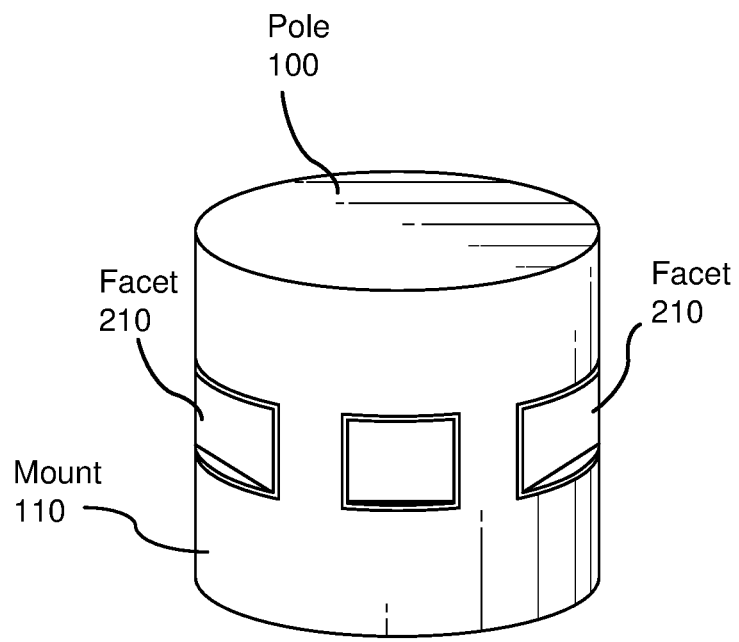
Figure 3:
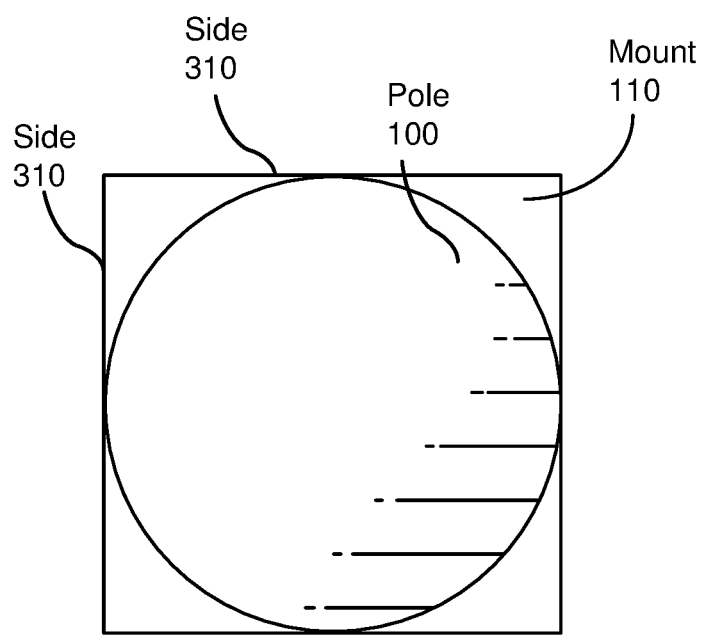

While FIGS. 1-3 depict mount 110 as being located at or near a top portion of pole 100, other positions for mount 110 on pole 100, such as a more vertically centralized location along pole 100, are also possible in other examples.

Figure 4:
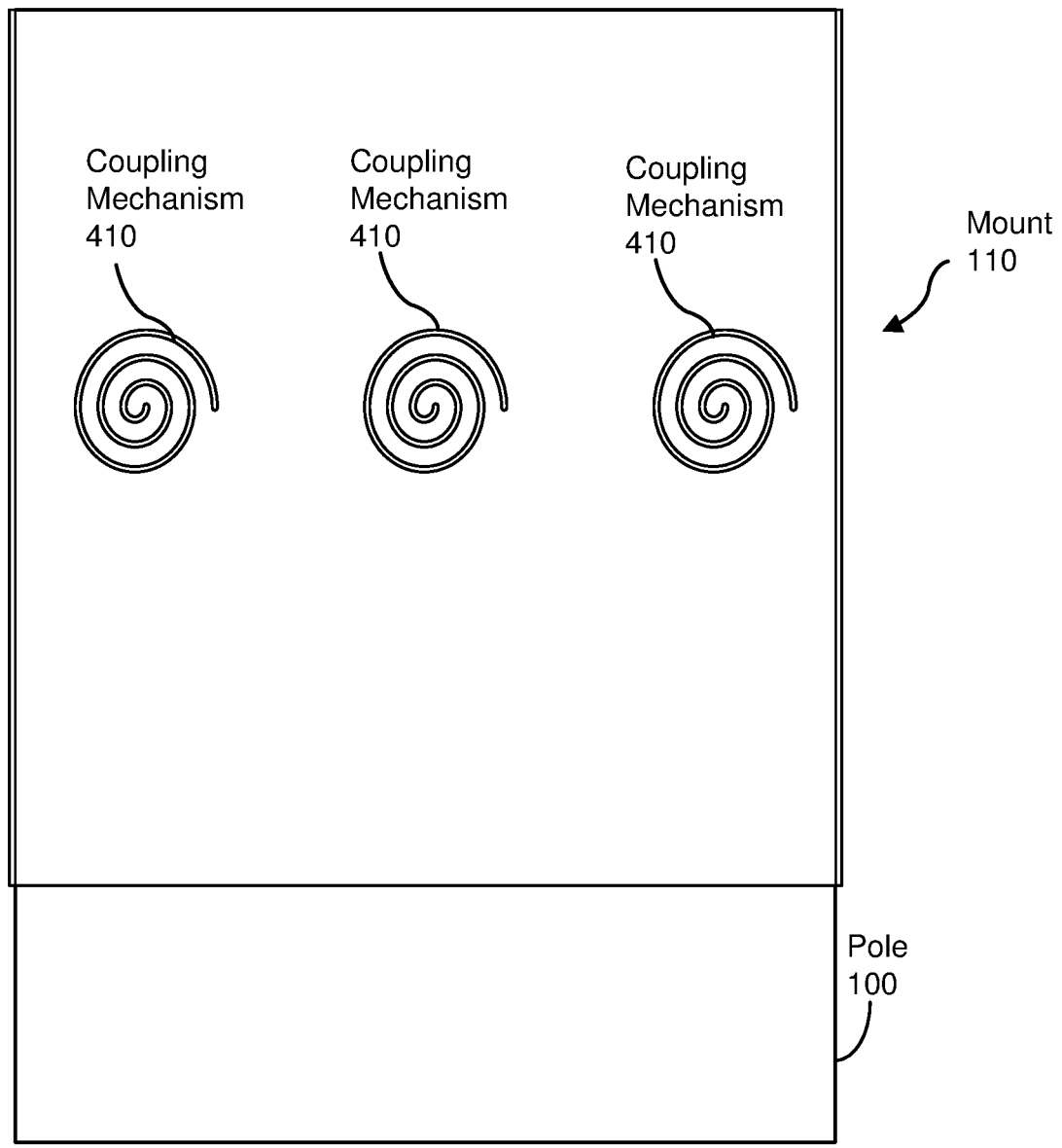
FIGS. 4 and 5 depict exemplary coupling mechanisms associated with a mount and an electronic device, respectively, according to certain embodiments.
Figure 5:
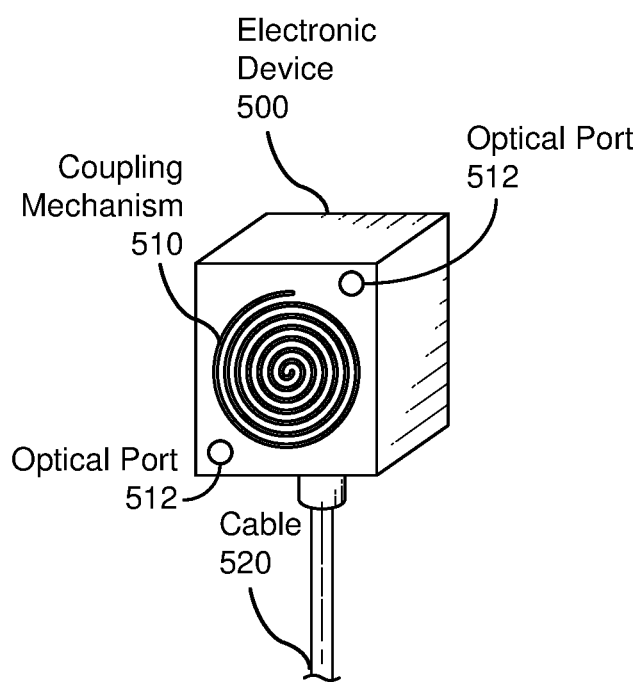

FIG. 4 shows exemplary coupling mechanisms 410 associated with mount 110, and FIG. 5 shows an exemplary coupling mechanism 510 within a deployable apparatus 500 (e.g., an electronic device 500). Coupling mechanisms 410 and/or 510 may be configured in any suitable manner. For example, coupling mechanisms 410 and/or 510 may be non-contact coupling mechanisms (e.g., flat coils). In some examples, non-contact coupling mechanisms 410 and/or 510 may operate magnetically at a low frequency range (e.g., possible including a frequency of zero), electrically at a high frequency range, electromagnetically in some mid frequency range (e.g., 1-50 MHz), and/or in any other suitable manner. Coupling mechanisms 410 and/or 510 may enable mechanical coupling, magnetic coupling (e.g., an inductive or capacitive coupling), and/or power coupling (e.g., a contact power coupling via a hardware contact interface, a noncontact power coupling using an inductive or capacitive coupling, and so on) between mount 110 and electronic device 500.

In some embodiments, each of one or more coupling mechanisms 410 associated with mount 110 may be located at or near an installation surface (e.g., facet 210 or side 310) of mount 110, thus facilitating magnetic, mechanical, and/or power coupling between mount 110 and electronic device 500 when electronic device 500 is installed at any of multiple installation surfaces of mount 110.

With respect to magnetic coupling, coupling mechanism 410 may generate a magnetic field sufficient (e.g., via a coil carrying direct current (DC) or alternating current (AC)) to attract electronic device 500 to, and/or retain electronic device 500 against, an installation surface of mount 110. In at least some examples, the electrical current carried in coupling mechanism 410 may be provided by a power source, such as a power source located within pole 100, or a remote power source that supplies power via pole 100 (e.g., via powerline conductors supported by pole 100). In some embodiments, coupling mechanism 510 of electronic device 500 may be configured to interact with a magnetic field generated by coupling mechanism 410 associated with mount 110 so that a force is imposed on electronic device 500 against an installation surface of mount 110.

In some embodiments, the installation surface and/or a corresponding surface of electronic device 500 may include one or more registration marks (e.g., lines, crosshairs, etc.) that facilitate proper alignment of coupling mechanism 510 with coupling mechanism 410 (or, more generally, proper alignment of electronic device 500 with mount 110) by way of an optical detector (e.g., camera, photosensor, etc.) to facilitate magnetic coupling, mechanical coupling, power coupling, and/or other types of coupling between mount 110 and electronic device 500. In some examples, proper or correct alignment between mount 110 and electronic device 500 may be aided by way of a shape or other surface feature (e.g., detents, protrusions, etc.) of the installation surface of mount 110 that physically interfaces with a corresponding shape or other surface feature of an associated surface of electronic device 500.

Further, in some examples, coupling mechanism 410 associated with mount 110 and/or coupling mechanism 510 of electronic device 500 may include a mechanical coupling mechanism that, when activated, mechanically retains a corresponding mechanical feature of coupling mechanism 410 or 510. For example, a latch or similar mechanism may be mechanically activated (e.g., by way of physical contact with electronic device 500) or electronically activated to engage with a mechanical feature of electronic device 500 to retain or secure electronic device 500 against an installation surface of mount 110. In at least some embodiments, the mechanical coupling mechanism may be mechanically or electronically releasable so that electronic device 500 may disengaged and removed from mount 110. In some embodiments, magnetic coupling may be employed initially to retain electronic device 500 against mount 110, after which mechanical coupling may be used to ensure electronic device 500 remains securely attached to mount 110, such as in the event of a power failure at mount 110.

In some examples, coupling mechanisms 410 and 510 may also be configured to provide electrical power from pole 100 (e.g., via an installation surface of mount 110) to electronic device 500. Coupling mechanisms 410 may be configured and/or attached to mount 110 and/or pole 100 in a manner that enables efficient power transfer to electronic device 500. In some embodiments, coupling mechanisms 410 may be configured in a manner that wholly or partially protects coupling mechanisms 410 from an external environment (e.g., coupling mechanisms 410 may be installed inside of mount 110 and/or pole 100). In some examples, coupling mechanisms 410 and 510 may include inductive coupling mechanisms in which coupling mechanism 410 (e.g., a first coil) generates a magnetic field that may induce an electrical current in coupling mechanism 510 (e.g., a second coil) to provide electrical power to operate electronic device 500 and/or charge a battery of electronic device 500. Consequently, in at least some examples, coupling mechanism 410 need not make direct physical contact with coupling mechanism 510 of electronic device 500. In other examples, coupling mechanisms 410 and 510 may be capacitive coupling mechanisms that may generate a magnetic field for coupling electronic device to mount 110.

In other embodiments, coupling mechanism 410 may make physical contact with coupling mechanism 510 (e.g., by way of two or more electrical contacts) to provide electrical power to electronic device 500 when electronic device 500 is installed at an installation surface of mount 110. Moreover, in some examples, such coupling mechanisms 410 and 510 may additionally serve as an alignment mechanism between mount 110 and electronic device 500, in a manner similar to that described above.

Further, as shown in FIG. 5, electronic device 500 may include a short-range communication interface (e.g., one or more optical ports 512) that may communicate with corresponding ports in or near mount 110 (not shown in FIGS. 1-4). In some examples, optical ports 512 may be short-range (e.g., approximately 1 mm or less) high-speed optical ports. In other embodiments, a contact or wireless (e.g., approximately 1 mm or less) electrical communication interface may be employed for communication between electronic device 500 and a corresponding interface in or near mount 110, as is described in greater detail below.

The apparatuses and methods disclosed herein may couple any suitable type of electronic device 500 to an infrastructure component, such as pole 100. For example, electronic device 500 may include one or more wireless networking devices (e.g., antennas), wired networking devices, any other suitable electronic component, physical and/or digital signage (e.g., a color E-ink display), traffic signals, surveillance cameras, and so on. In some embodiments, electronic device 500 includes an external box or chassis that, when electronic device 500 is installed, makes physical contact with an installation surface of mount 110. While FIG. 5 shows a cable 520 (e.g., a fiber cable) extending from electronic device 500, in other embodiments, electronic device 500 may only have wireless connections and therefore may not include cable 520. In embodiments that involve a wired connection from electronic device 500, a robotic system (e.g., a UAV or drone) and/or a human operator may connect cable 520 from electronic device 500 to a terminal in mount 110 or pole 100. Alternatively, a robotic system or a human operator may connect cable 520 extending from mount 110 or pole 100 to a terminal on electronic device 500.

Figure 6:
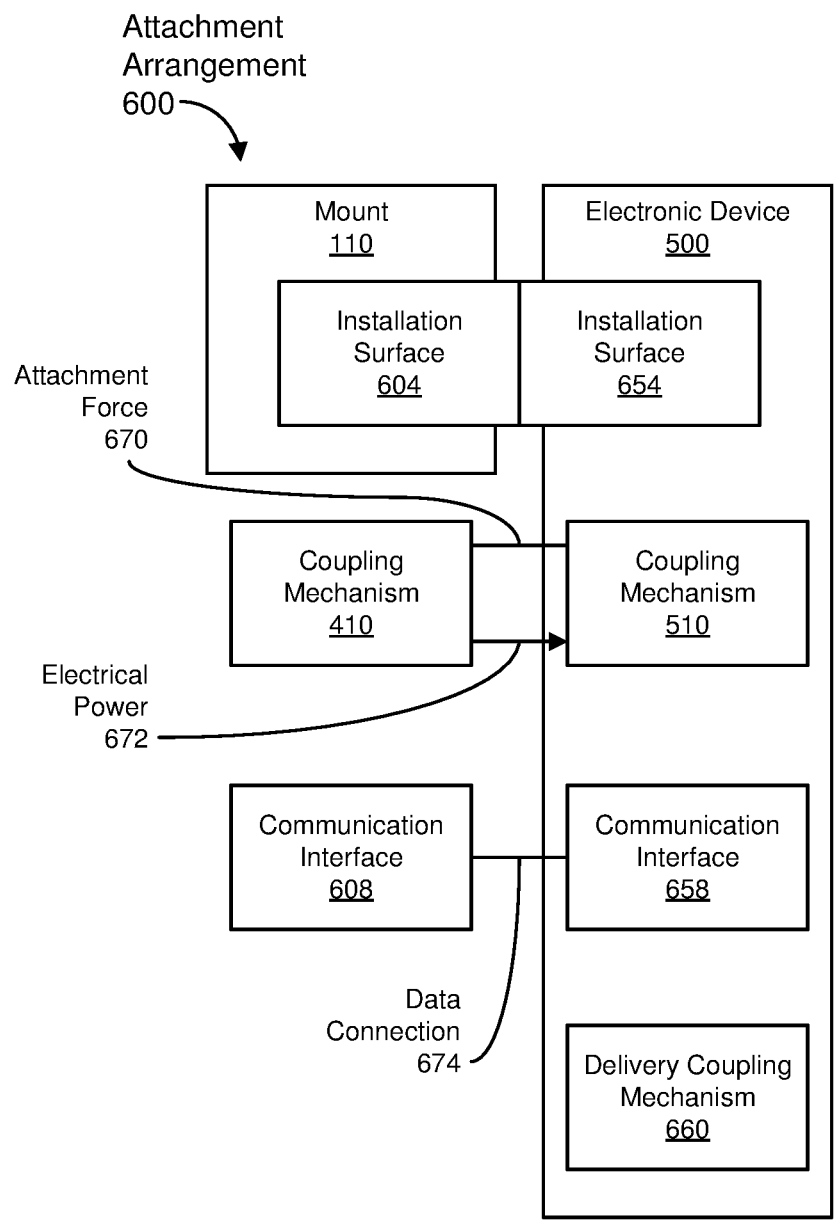
FIG. 6 is a block diagram of an exemplary attachment arrangement and installed electronic device, according to certain embodiments.

FIG. 6 is a block diagram of an example of electronic device 500 installed at an attachment arrangement 600 that includes mount 110. As depicted in FIG. 6, mount 110 and electronic device 500 include corresponding installation surfaces 604 and 654, respectively, intended to contact each other when electronic device 500 is installed. As indicated above, installation surface 604 of mount 110 may be a facet 210, side 310, or the like, and installation surface 654 of electronic device 500 may be a corresponding physical surface compatible with installation surface 604 for stable installation of electronic device 500 at mount 110.

As illustrated in FIG. 6, in some embodiments, attachment arrangement 600 includes coupling mechanism 410, while electronic device 500 includes corresponding coupling mechanism 510. In some embodiments, coupling mechanisms 410 and 510 may facilitate installation of electronic device 500 at mount 110 via installation surfaces 604 and 654 by way of attachment force 670. In some examples, attachment force 670 may operate through installation surfaces 604 and 654. In some embodiments, attachment force 670 may be magnetic and/or mechanical in nature, as described in greater detail above. Further, in at least some examples, coupling mechanisms 410 and 510 may cooperate to facilitate transfer of electrical power 672 (e.g., via inductive coupling, direct contact, or the like) from attachment arrangement 600 to electronic device 500 (e.g., for operation or energy storage), as described above. While coupling mechanisms 410 and 510 are shown in FIG. 6 as being separate from installation surfaces 604 and 654, in at least some examples, coupling mechanisms 410 and 510 may operate through either or both installation surfaces 604 and 654. Consequently, attachment force 670 and/or electrical power 672 may be transferred across either or both installation surfaces 604 and 654. In some examples, electronic device 500 may include a battery that may be charged by electrical power 672 and that may also provide power for electronic device 500 when electronic device 500 is not installed at mount 110 and under failure conditions when attachment arrangement 600 is not providing electrical power 672.

In some embodiments, attachment force 670 that couples electronic device 500 to mount 110 of pole 100 may be magnetic (e.g., in the 200 hertz (Hz) to 2 kHz range to avoid any AC frequencies in the 50-120 Hz range) with embedded power electronics, coils, and/or magnetic containment on each installation surface 604 of mount 110 and/or a corresponding magnetic interface on coupling mechanism 510 of electronic device 500. For example, electronic device 500 and mount 110 may include DC magnetic interfaces (e.g., capacitive coupling interfaces) as part of coupling mechanisms 410 and 510, respectively, to hold electronic device 500 against installation surface 604 of mount 110.

Also shown in FIG. 6 is a communication interface 608 of attachment arrangement 600 and a corresponding communication interface 658 of electronic device 500, between which a data connection 674 may be formed. In some embodiments, communication interfaces 608 and 658 may include an optical communication interface. For example, such an optical communication interface may be an over-the-air, short-range (e.g., approximately 1 millimeter (mm)) high-speed optical connection employed using light-emitting diodes (LEDs), laser diodes, or other photoemitters in conjunction with photodiodes or other photosensitive receivers. In some examples, such an optical connection may occur via installation surfaces 604 and 654. In other embodiments, communications interfaces 608 and 658 may include a physical (e.g., direct contact) electrical interface, a wireless (e.g., Bluetooth® Low Energy, or BLE) interface, a short-range non-contact wireless radio-frequency (RF) interface (e.g., employing small electrode pairs coupled capacitively and spaced within 1 mm apart, and thus being positioned less than a communication wavelength apart), or other short-range communication interface.

Also depicted in FIG. 6, in some embodiments, is a delivery coupling mechanism 660 that facilitates a physical connection to a delivery system or device for delivering electronic device 500 to, and installing electronic device 500 at, mount 110. In some embodiments, delivery coupling mechanism 660 may include a mechanical coupling mechanism, a magnetic coupling mechanism, and/or another type of mechanism sufficient to securely carry electronic device 500 during delivery and installation.

Figure 7:
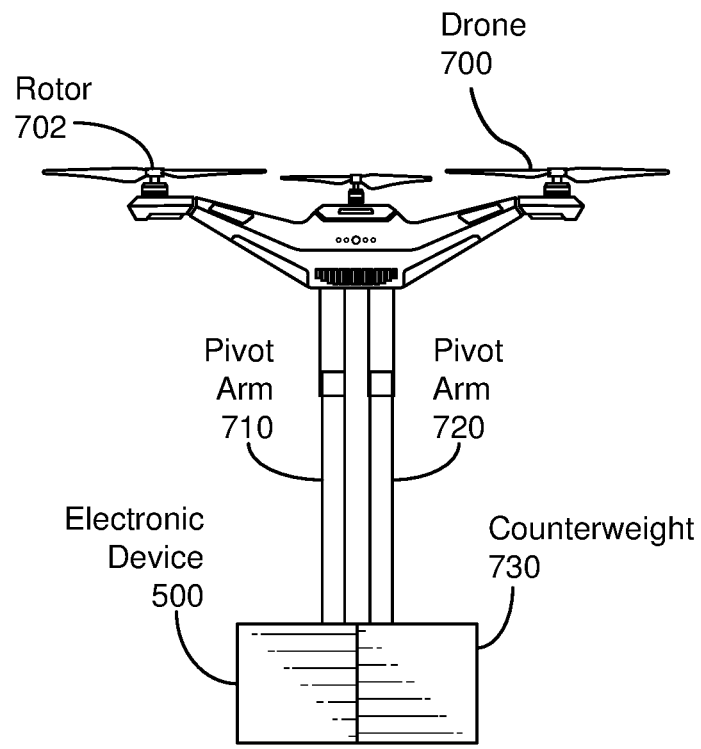
FIGS. 7-9 depict an exemplary deployment drone and corresponding electronic device to be delivered and deployed, according to certain embodiments.
Figure 8:
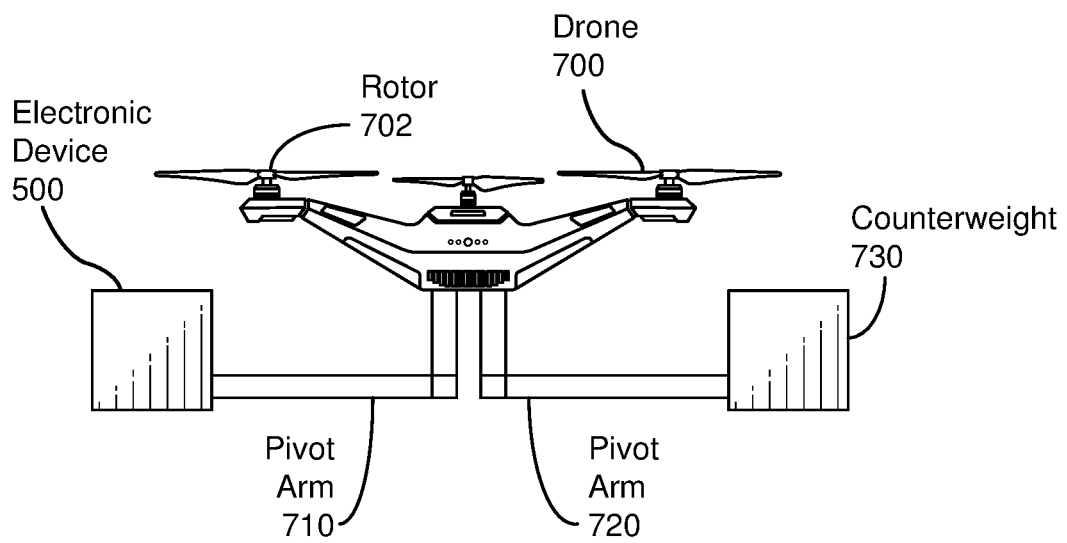
Figure 9:
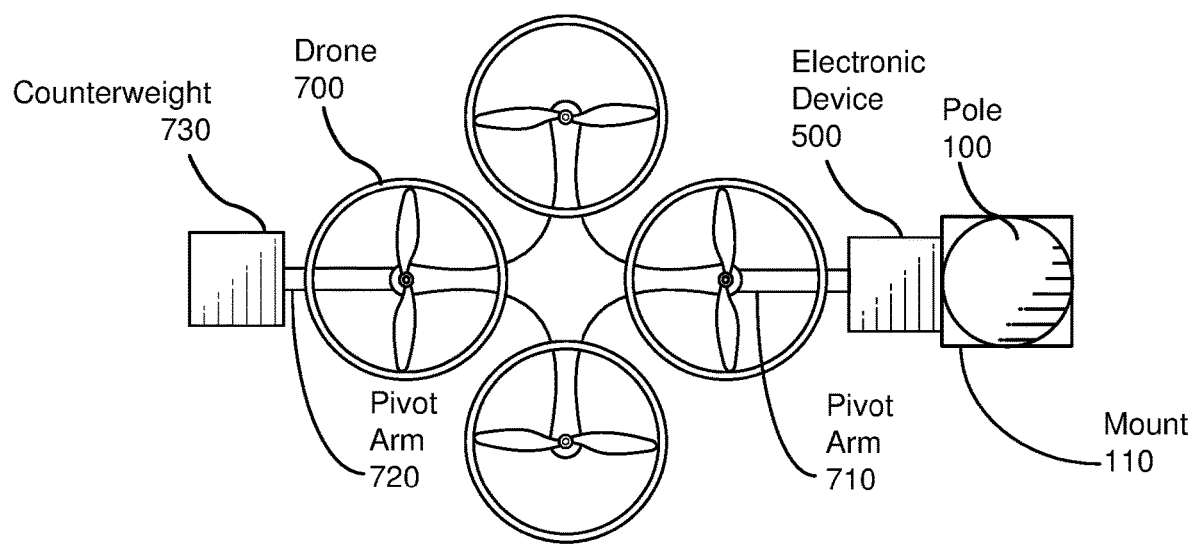

Various types of delivery systems may deploy electronic device 500 by coupling electronic device 500 to mount 110 of pole 100. In some embodiments, as shown in FIGS. 7-9, a deployment drone 700 (e.g., a UAV), by way of one or more rotors 702, may carry electronic device 500 from a distribution location to an installation location (e.g., mount 110). In some embodiments, drone 700 may include a pivot arm 710 (e.g., a gravity-based pivot arm) that may be dynamically controlled (e.g., swiveled) between a vertically-oriented transit position (e.g., a position that reduces torque on drone 700 by allowing electronic device 500 to be positioned directly below drone 700, as illustrated in FIG. 7) to an installation position (e.g., a position that extends electronic device 500 substantially horizontally from a vertical center axis of drone 700 to allow rotors 702 to clear pole 100 while electronic device 500 is attached to mount 110, as depicted in FIGS. 8 and 9). In some examples, when extended, electronic device 500 presents its installation surface 654 toward installation surface 604 of mount 110.

In some embodiments, as shown in FIGS. 7-9, drone 700 may also include a second pivot arm 720, possibly with a counterweight 730 attached thereto, that may be extended in a direction opposite to that of first pivot arm 710 and electronic device 500 to prevent significant torque from being imposed on drone 700, thus maintaining the drone in a rotationally balanced position when first pivot arm 710 dynamically extends electronic device 500. In the absence of second pivot arm 720 and counterweight 730, drone 700 may counteract at least some torque imposed by the extension of electronic device 500 by way of operating at least one rotor 702 of drone 700 independently to maintain drone 700 in a rotationally balanced position.

In other examples, drone 700 may provide other mechanisms for delivering and installing electronic device 500, such as a downward extending mechanism (e.g., including a cable or a telescoping arm) that extends electronic device 500 downward from drone 700 for installation at mount 110.

In other embodiments, drone 700 may utilize other mechanisms not explicitly described herein for delivery and installation of electronic device 500.

While the above discussion concentrates on the use of drone 700 as a delivery and installation system, other types of devices may serve as a delivery device or system in other embodiments. For example, a mechanical device, such as a telescoping or extension system, may carry electronic device 500 from a ground location near pole 100 upward toward mount 110 for installation thereon. In other embodiments, an automated delivery and installation system may include a robot configured to traverse powerline conductors and install devices and/or cabling (e.g., fiber optic cable) along a power grid. Examples of such robots are discussed in U.S. Provisional Application No. 62/573,470, filed Oct. 17, 2017. As another example, the delivery system may be a robotic system configured to automatically (e.g., without human intervention) navigate to and climb pole 100 to install electronic device 500 on mount 110. Other types of delivery and installation systems not explicitly discussed herein may also be employed in other embodiments.

Figure 10:
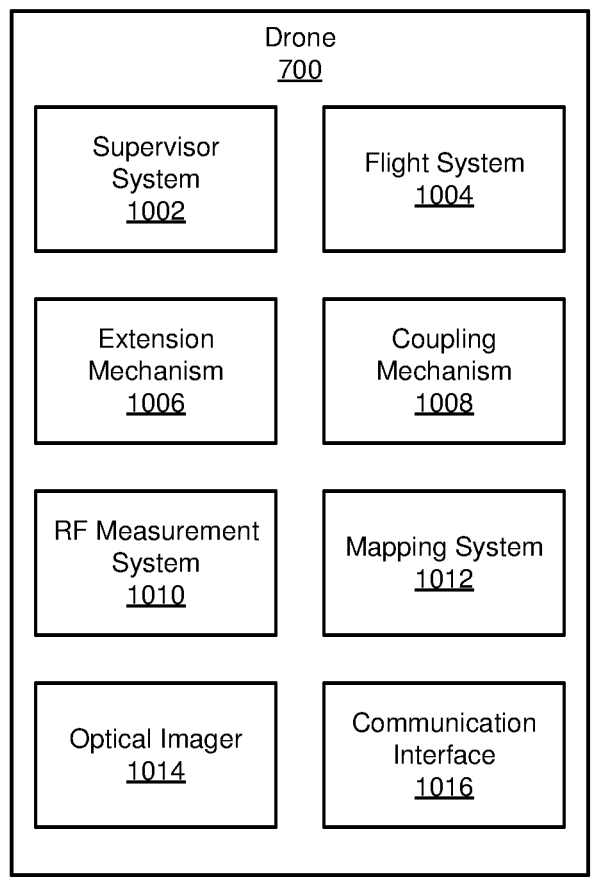
FIG. 10 is a block diagram of an exemplary deployment drone, according to certain embodiments.

FIG. 10 is a block diagram of an exemplary drone 700 to be employed as a delivery and installation system for electronic device 500. As depicted in FIG. 10, drone 700 may include a supervisor system 1002, a flight system 1004, an extension mechanism 1006, a coupling mechanism 1008, an RF measurement system 1010, a mapping system 1012, an optical imager 1014, and/or a communication interface 1016. In some embodiments, supervisor system 1002 may control the remaining systems and mechanisms 1004-1016 of drone 700 to facilitate at least partially autonomous operation of drone 700 during the delivery and installation of electronic device 500, as well as other functions described more fully below. In some examples, supervisor system 1002 may include one or processors that execute one or more instructions stored in a memory (not explicitly shown in FIG. 10) to control systems and mechanisms 1004-1016 of drone 700.

Flight system 1004, in at least some embodiments, may include rotors 702 of drone 700, and may operate rotors 702 to accurately and safely deliver and install electronic device 500 at mount 110. In some examples, supervisor system 1002 or flight system 1004 may include a navigation system to maneuver drone 700 to performs its delivery and installation functions, as well as other functions described below. Further, such a navigation system may include one or more sensors or detectors (e.g., a camera, a Global Positioning System (GPS) receiver, and the like) for navigating to a desired geographic location at which pole 100 is located, and for sensing a surrounding environment. In some examples, flight system 1004 may employ other types of previously generated data (e.g., computer vision data, point cloud data, and so on) to facilitate navigation.

In some embodiments, extension mechanism 1006 may include one or more mechanisms, such as pivot arms 710 and 720, as well as motors, latches, and/or other components for extending electronic device 500 and/or counterweight 730 for successful delivery and installation of electronic device 500. Additionally, coupling mechanism 1008 may interact with delivery coupling mechanism 660 of electronic device 500 to attach to and/or release electronic device 500 to facilitate the successful and secure transfer of electronic device 500 from drone 700 to mount 110. In some examples, coupling mechanism 1008 may include a magnetic and/or mechanical coupling mechanism, such as those described above, to securely retain and/or release electronic device 500.

Drone 700, in addition to its delivery and installation operations, may perform other duties that support the use of electronic device 500 in a number of roles. For example, in examples in which multiple electronic devices 500 are wireless communication devices (e.g., using communication interface 658) that collectively form a communication network (e.g., a mesh network, a cellular network, or the like), drone 700 may include a radio-frequency (RF) measurement system 1010 that measures the strength, quality, and possibly other characteristics of RF signals in multiple locations as drone 700 moves about a field of one or more installed electronic devices 500.

Based on those signal measurements, drone 700, or another system with which drone 700 communicates (e.g., a diagnostic processing system, a computer system server, or the like), may determine that changes may be made to one or more electronic devices 500, such as to improve overall signal coverage or other characteristics of the overall communication system. To effect such changes, in some embodiments, drone 700 may alter a location of one or more electronic devices 500 (e.g., from one installation surface of mount 110 to another, or from one mount 110 to another). In some examples, electronic device 500 or mount 110 may include a tilt mechanism for vertical pointing, a swivel mechanism for horizontal adjustment, and/or any other type or form of calibration mechanism for communicating using communication interface 658. Calibration mechanisms may be internally actuated (e.g., by actuators within mount 110 or pole 100, such as to alter an orientation of installation surface 604, and thus installed electronic device 500), externally actuated (e.g., by drone 700), and/or in any other suitable manner. For example, drone 700 may be configured with a camera (or any other suitable sensor) that enables drone 700 to direct pivot arm 710 (or any other suitable actuation mechanism) to tilt, swivel, or otherwise calibrate an antenna or other device of electronic device 500 after electronic device 500 is installed on mount 110. Additionally or alternatively, drone 700 may establish a wireless link to electronic device 500 to fulfill a predetermined deployment plan (e.g., a deployment plan that was predetermined based on LIDAR (light detection and ranging) measurements, as is discussed in greater detail below in connection with mapping system 1012).

Drone 700 may also be configured to perform maintenance and troubleshooting operations regarding an electronic device 500. For example, drone 700 may fly to a location where electronic device 500 is installed and communicatively connect to electronic device 500 via a Bluetooth® Low Energy (BLE) interface, or via any other suitable wireless signal (e.g., using communication interface 1016). Drone 700 may also possess connectivity to a central server, where a human operator or automated system may connect over the air to electronic device 500 (e.g., also via communication interface 1016) and perform software maintenance (e.g., a firmware upgrade), reset or reboot electronic device 500, or remotely diagnose and/or correct a problem in electronic device 500, which may be facilitated by console access to electronic device 500. In some examples, electronic device 500 may include a BLE module (e.g., within communication interface 658), and drone 700 may communicatively connect to electronic device 500 while hovering near thereto to perform such maintenance activity. Once the intended activity is complete, drone 700 may disconnect and depart. In other examples, drone 700 may determine that electronic device 500 is inoperative, possibly resulting in drone 700 removing electronic device 500 from mount 110, returning electronic device 500 to a maintenance facility, retrieving a second electronic device 500, and delivering and installing the second electronic device 500 at the mount 110.

As mentioned above, drone 700 may install electronic device 500 at a particular location and/or orientation (e.g., using an intended mount 110) so that electronic device 500 may perform its associated functions (e.g., as a communication node in a network) based on a predetermined deployment plan. To that end, drone 700 may employ mapping system 1012 to map out areas (e.g., detect poles 100, buildings, and other physical objects or features). In some embodiments, mapping system 1012 may include LIDAR equipment, camera equipment, and/or any other suitable surveying or sensing technology to map geographical areas and automatically or semi-automatically establish a deployment plan. For example, drone 700 may incorporate LIDAR measurement to facilitate real-time attachment network modeling via a cloud or backend server system, which may perform ray-tracing of paths in a communication network (e.g., to ensure line-of-sight (LOS) for electronic devices 500 in serving the local area) to facilitate one or more types of network models (e.g., models for point-to-point networks, point-to-multipoint networks, and so on). In some examples, use of LIDAR measurements using drone 700 may generate higher-resolution measurements of local structures compared to other methods. Based on those measurements, drone 700 may perform the initial installation of electronic devices 500 as part of a communication network and/or alter aspects (e.g., location, orientation, operational characteristics, and so on) of previously installed electronic devices 500 of an existing network in real-time.

Optical imager 1014, in some examples, may be configured to read a bar code, QR (Quick Response) code, or other visual code, symbol, or the like from mount 110, electronic device 500, and/or the like. In some embodiments, such a code or symbol may include information (e.g., registration information) that may facilitate registration, authentication, and/or provisioning of electronic device 500 for communication with attachment arrangement 600 and/or drone 700, such as by way of a wireless (e.g., high-speed optical) or wired communication connection.

Communication interface 1016, as discussed above, may communicate with either or both of electronic device 500 (e.g., before or after installation at mount 110) and a cloud or backend (e.g., server) system. In some examples, drone 700 may employ communication interface 1016 to communicate with communication interface 608 of attachment arrangement 600 at pole 100, such as to verify proper authentication and/or installation of electronic device 500 at mount 110, as discussed more fully below. In some examples, communication interface 1016 may include a BLE interface that may be employed to facilitate registration, authentication, and/or provisioning of electronic device 500 (e.g., instead of optical imager 1014) for communication with attachment arrangement 600 and/or drone 700 via another wired or wireless (e.g., high-speed optical) interface supported by communication interface 1016.

Figure 11:
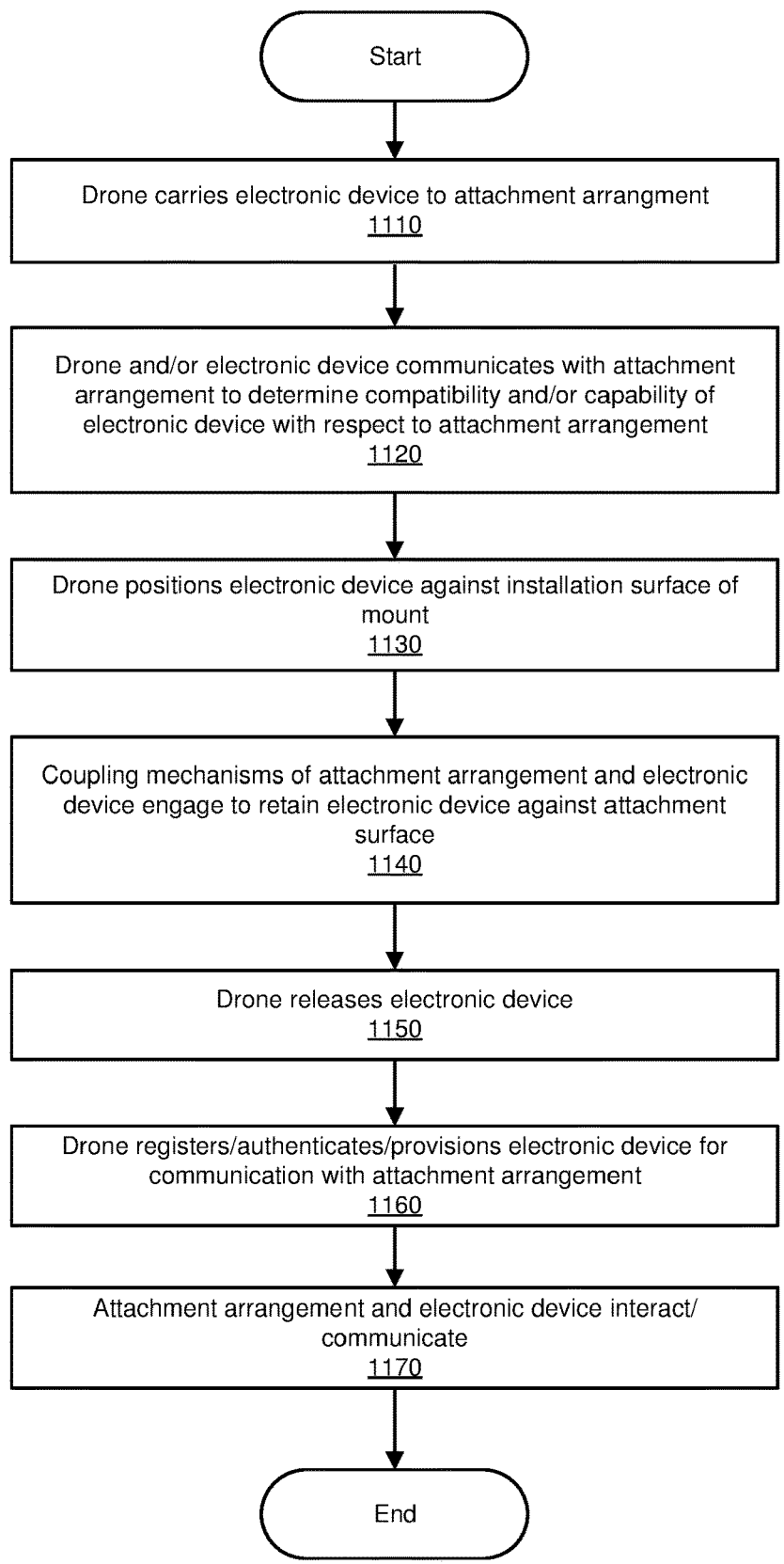
FIG. 11 is a flow diagram of an exemplary method of delivering and deploying an electronic device to an attachment arrangement using a deployment drone, according to certain embodiments.

FIG. 11 is a flow diagram of an exemplary method 1100 of delivering an electronic device (e.g., electronic device 500) to an attachment arrangement (e.g., attachment arrangement 600) involving the electronic device, the attachment arrangement, and a delivery system or device (e.g., drone 700). The steps shown in FIG. 11 may be performed in part by any suitable computer-executable code and/or computing or processing system, including the systems or devices illustrated in FIGS. 6 and 10. While the particular steps of method 1100 are described below as being performed by drone 700, electronic device 500, and/or attachment arrangement 600, other devices or systems may perform these operations in other embodiments. In one example, each of the steps shown in FIG. 11 may represent an algorithm whose structure includes and/or is represented by multiple sub-steps, examples of which will be provided in greater detail below.

As illustrated in FIG. 11, at step 1110, drone 700 may carry or deliver electronic device 500 to attachment arrangement 600. In some embodiments, drone 700 (e.g., using flight system 1004), may employ geolocation technology (e.g., a GPS receiver), a visual sensing system (e.g., a camera), and/or other technologies to navigate drone 700, with electronic device 500 attached, safely to a particular infrastructure component (e.g., pole 100) for installation at associated attachment apparatus 600. In some examples, pole 100 may be selected from among multiple such poles 100 for installation of electronic device 500 according to a predetermined deployment plan, which may have involved use of drone 700 for performing localized mapping, as discussed above. Also, in some embodiments, drone 700 may carry electronic device 500 in a relative position that places drone 700 in a rotationally balanced state, such as that described above in conjunction with FIG. 7.

At step 1120, drone 700 and/or electronic device 500 may communicate with attachment arrangement 600 (e.g., via communication interface 608, 658, and/or 1016) to determine or confirm the compatibility or capability of electronic device 500 with respect to engaging with attachment arrangement 600. For example, attachment arrangement 600 may initiate a negotiation with electronic device 500 or drone 700 to authenticate electronic device 500 as being capable of, or authorized to, being installed at mount 110. As part of this authentication, attachment arrangement 600 may determine whether electronic device 500 may draw electrical power 672 (e.g., via coupling mechanism 410 of attachment arrangement 600), or whether electronic device 500 may supply its own electrical power (e.g., via a solar panel, photovoltaic cell, or the like). During such authentication, attachment arrangement 600 may institute a security measure (e.g., by requiring a password or security key from electronic device 500) to determine whether to provide attachment force 670 and/or electrical power 672 (e.g., via coupling mechanism 410) to electronic device 500.

Presuming electronic device 500 is configured and authenticated to be installed at mount 110, at step 1130, drone 700 may position electronic device 500 against installation surface 604 of mount 110. In some embodiments, to facilitate such an operation, drone 700 may operate pivot arm 710 to place electronic device 500 in position to be installed at installation surface 604, as illustrated in FIG. 8. Moreover, in some examples, drone 700 may operate second pivot arm 720 extend counterweight 730 to maintain drone 700 in a rotationally balanced state. Thereafter, drone 700 may place electronic device 500 (e.g., at installation surface 654) against installation surface 604 of mount 110, as illustrated in FIG. 9. In some embodiments, registration marks, surface features, or other aspects of installation surface 604 and/or installation surface 654 may be employed to accurately place electronic device 500 at mount 110.

At step 1140, in some examples, coupling mechanisms 410 and/or 510 of attachment arrangement 600 and electronic device 500, respectively, may be activated to retain installation surface 654 of electronic device 500 against installation surface 604 of attachment arrangement 600 (e.g., using attachment force 670). In some examples, electronic device 500 and/or drone 700 may communicate with attachment arrangement 600 to cause the activation of coupling mechanisms 410 and/or 510. As described above, in some embodiments, attachment force 670 may be generated using inductive coupling to generate a magnetic force, activating a mechanical coupling mechanism to retain a mechanical feature of electronic device 500, and/or using other technologies to retain electronic device 500 against mount 110. In some examples, once electronic device 500 is securely installed, coupling mechanism 1008 of drone 700 may release electronic device 500 at step 1150.

In some embodiments, at step 1160, drone 700 may register, authenticate, and/or provision electronic device 500 with attachment arrangement 600 to facilitate communication between electronic device 500 and attachment arrangement 600. For example, drone 700 may read one or more bar codes, QR codes, or other visual symbols (e.g., via optical imager 1014) provided on a surface of electronic device 500 and/or mount 110. These codes or symbols may include information (e.g., media access control (MAC) address or other identifier) that drone 700 may then use to facilitate communication between electronic device 500 and attachment arrangement 600. In other examples, drone 700 may employ a BLE interface (e.g., incorporated in communication interface 1016) to communicate with electronic device 500 and/or attachment arrangement 600 to register, authenticate, and/or provision electronic 500 for subsequent communication with attachment arrangement 600.

At step 1170, attachment arrangement 600 and electronic device 500 may interact and/or communicate. In some embodiments, attachment arrangement 600 may generate electrical power 672 for reception and use by electronic device 500 (e.g., via coupling mechanism 410 and 510 using inductive coupling). Also, in some embodiments, attachment arrangement 600 and electronic device 500 may communicate (e.g., via communication interfaces 608 and 658, such as via a high-speed optical interface, or via a direct-contact or wireless electrical interface). For example, electronic device 500 may communicate with a backend or cloud system via attachment arrangement 600 and a backend network (e.g., via electrical connections, fiber optic cable, or the like). Further, electronic device 500 may perform operations for which electronic device 800 was configured, such as network communications, electronic signage, traffic control, and so forth.

As explained above in conjunction with FIGS. 1 through 11, the apparatuses, systems, and methods described herein may facilitate remote installation, configuration, and/or maintenance of a plurality of electronic devices operating at disparate locations. In some embodiments, infrastructure components (e.g., utility poles) may serve as a foundation for a mount and a coupling mechanism that may retain (e.g., magnetically and/or mechanically) an electronic device (e.g., remotely delivered by way of a UAV or other delivery device) on the mount. Further, in some examples, electrical power may be transferred via the mount to the electronic device so that the electronic device may perform its intended functions. In some embodiments, the delivery vehicle may perform desirable operations associated with the use of the electronic devices, both before installation (e.g., high-resolution geographical mapping) and after installation (e.g., network signal measurement, configuration and maintenance of electronic devices, and so on) of the electronic devices. Consequently, in some examples, expenses incurred in the planning, deployment, and maintenance of remote electronic devices may be greatly reduced.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An attachment arrangement comprising:
   a mount of a pole, the mount comprising a plurality of installation surfaces, each of the plurality of installation surfaces facing in a different direction, wherein an installation surface of the plurality of installation surfaces contacts an installed electronic device; and
   a coupling mechanism that:
      provides a force causing a corresponding installation surface of the installed electronic device to maintain contact with the installation surface; and
      delivers electrical power via the installation surface to the installed electronic device.

2. The attachment arrangement of claim 1, wherein the mount comprises a collar that securely attaches the mount to the pole.

3. The attachment arrangement of claim 1, wherein:
   each of the plurality of installation surfaces comprises an external flat surface; and
   the external flat surface of the installation surface contacts a corresponding flat surface of the installed electronic device.

4. The attachment arrangement of claim 1, wherein the installation surface comprises at least one visible registration mark that aids positioning of the installed electronic device relative to the installation surface during installation.

5. The attachment arrangement of claim 1, wherein the coupling mechanism comprises an inductive coupling mechanism that generates a magnetic force between the coupling mechanism and the installed electronic device.

6. The attachment arrangement of claim 5, wherein the inductive coupling mechanism also delivers the electrical power to the installed electronic device without the inductive coupling mechanism directly contacting the installed electronic device.

7. The attachment arrangement of claim 1, wherein the coupling mechanism comprises a mechanical coupling mechanism that, when activated, mechanically retains a corresponding mechanical feature of the installed electronic device.

8. The attachment arrangement of claim 1, further comprising:
a short-range communication interface that communicates with the installed electronic device.

9. The attachment arrangement of claim 8, wherein the short-range communication interface comprises a short-range optical communication interface.

10. An electronic device comprising:
an installation surface that contacts a corresponding installation surface of a mount of a pole;
a first coupling mechanism that:
interacts with a corresponding coupling mechanism of an attachment arrangement that includes the mount to cause the installation surface of the electronic device to maintain contact with the corresponding installation surface of the mount; and
receives electrical power from the corresponding coupling mechanism via the installation surface; and
a second coupling mechanism that interacts with a corresponding coupling mechanism of a vehicle for carrying the electronic device to the mount for installation.

11. The electronic device of claim 10, wherein the installation surface comprises at least one external flat surface that contacts a corresponding flat surface of the mount.

12. The electronic device of claim 10, wherein the coupling mechanism comprises an inductive coupling mechanism that interacts with a corresponding inductive coupling mechanism of the attachment arrangement to generate a magnetic force between the coupling mechanism and the corresponding coupling mechanism.

13. The electronic device of claim 12, wherein the inductive coupling mechanism also receives the electrical power from the mount via the installation surface without the inductive coupling mechanism directly contacting the mount.

14. The electronic device of claim 10, wherein the coupling mechanism comprises a mechanical feature that, when engaged by a mechanical coupling mechanism of the attachment arrangement, is mechanically retained by the attachment arrangement.

15. The electronic device of claim 10, further comprising:
a short-range communication interface that communicates with the attachment arrangement.

16. The electronic device of claim 15, wherein the short-range communication interface comprises a short-range optical communication interface.

17. The electronic device of claim 10, wherein the vehicle is an unmanned aerial vehicle for carrying the electronic device from a remote location to the mount for installation.

* * * * *